United States Patent
Kim

(10) Patent No.: US 9,055,460 B1
(45) Date of Patent: *Jun. 9, 2015

(54) LOCATION-BASED DETECTION OF INTERFERENCE IN CELLULAR COMMUNICATIONS SYSTEMS

(71) Applicant: Marvell International Ltd., Hamilton (BM)

(72) Inventor: Kyungho Kim, San Jose, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/911,979

(22) Filed: Jun. 6, 2013

Related U.S. Application Data

(63) Continuation of application No. 12/534,361, filed on Aug. 3, 2009, now Pat. No. 8,472,968.

(60) Provisional application No. 61/087,842, filed on Aug. 11, 2008.

(51) Int. Cl.
*H04W 52/04* (2009.01)
*H04W 24/02* (2009.01)
*H04W 52/50* (2009.01)

(52) U.S. Cl.
CPC .............. *H04W 24/02* (2013.01); *H04W 52/50* (2013.01)

(58) Field of Classification Search
USPC ......... 455/63.1, 67.13, 68, 452, 456.1–456.6, 455/522; 370/230, 231, 233, 235
See application file for complete search history.

(56) References Cited

U.S. PATENT DOCUMENTS

| | | | |
|---|---|---|---|
| 4,337,463 A | 6/1982 | Vangen | |
| 4,366,350 A | 12/1982 | Lee et al. | |
| 4,385,384 A | 5/1983 | Rosbury et al. | |
| 4,805,215 A | 2/1989 | Miller | |
| 5,347,234 A | 9/1994 | Gersbach et al. | |
| 5,634,207 A | 5/1997 | Yamaji et al. | |
| 5,673,291 A | 9/1997 | Dent | |
| 5,708,656 A | 1/1998 | Noneman et al. | |
| 5,847,616 A | 12/1998 | Ng et al. | |
| 5,995,819 A | 11/1999 | Yamaji et al. | |
| 6,167,245 A | 12/2000 | Welland et al. | |
| 6,285,262 B1 | 9/2001 | Kuriyama | |
| 6,320,919 B1 | 11/2001 | Khayrallah et al. | |

(Continued)

FOREIGN PATENT DOCUMENTS

| | | |
|---|---|---|
| CN | 102067689 | 5/2011 |
| EP | 1860827 | 11/2007 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, 2012, 302 pages.

(Continued)

*Primary Examiner* — Khawar Iqbal

(57) ABSTRACT

The present specification describes techniques and apparatus that enable location-based detection of interference. In one or more implementations, a neighboring cell generating interference for a mobile device is determined based at least in part on a location of the mobile device.

20 Claims, 4 Drawing Sheets

(56) References Cited

U.S. PATENT DOCUMENTS

| | | |
|---|---|---|
| 6,347,091 B1 | 2/2002 | Wallentin et al. |
| 6,366,622 B1 | 4/2002 | Brown et al. |
| 6,374,117 B1 | 4/2002 | Denkert et al. |
| 6,438,364 B1 | 8/2002 | Waite |
| 6,452,458 B1 | 9/2002 | Tanimoto |
| 6,509,777 B2 | 1/2003 | Razavi et al. |
| 6,519,461 B1 | 2/2003 | Andersson et al. |
| 6,535,037 B2 | 3/2003 | Maligeorgos |
| 6,553,229 B1 | 4/2003 | Dent |
| 6,640,308 B1 | 10/2003 | Keyghobad et al. |
| 6,650,195 B1 | 11/2003 | Brunn et al. |
| 6,675,328 B1 | 1/2004 | Krishnamachari et al. |
| 6,738,358 B2 | 5/2004 | Bist et al. |
| 6,741,846 B1 | 5/2004 | Welland et al. |
| 6,741,862 B2 * | 5/2004 | Chung et al. ............... 455/452.1 |
| 6,754,189 B2 | 6/2004 | Cloutier et al. |
| 6,816,452 B1 | 11/2004 | Maehata |
| 6,816,718 B2 | 11/2004 | Yan et al. |
| 6,922,433 B2 | 7/2005 | Tamura |
| 6,934,566 B2 | 8/2005 | Kang et al. |
| 6,946,950 B1 | 9/2005 | Ueno et al. |
| 6,954,708 B2 | 10/2005 | Rakshani et al. |
| 7,079,811 B2 | 7/2006 | Lee et al. |
| 7,092,428 B2 | 8/2006 | Chen et al. |
| 7,139,540 B2 | 11/2006 | Wu et al. |
| 7,173,431 B1 | 2/2007 | Lo et al. |
| 7,174,488 B1 | 2/2007 | Chu |
| 7,206,840 B2 | 4/2007 | Choi et al. |
| 7,212,798 B1 | 5/2007 | Adams et al. |
| 7,239,882 B1 | 7/2007 | Cook |
| 7,257,095 B2 | 8/2007 | Liu |
| 7,286,009 B2 | 10/2007 | Andersen et al. |
| 7,298,183 B2 | 11/2007 | Mirzaei et al. |
| 7,310,023 B2 | 12/2007 | Cha et al. |
| 7,319,849 B2 | 1/2008 | Womac |
| 7,342,895 B2 | 3/2008 | Serpa et al. |
| 7,355,416 B1 | 4/2008 | Darshan |
| 7,377,441 B2 | 5/2008 | Wiklof et al. |
| 7,395,040 B2 | 7/2008 | Behzad |
| 7,403,018 B1 | 7/2008 | Lo et al. |
| 7,463,592 B2 | 12/2008 | Poncini et al. |
| 7,529,548 B2 * | 5/2009 | Sebastian ................... 455/452.1 |
| 7,564,826 B2 | 7/2009 | Sherman et al. |
| 7,595,768 B2 | 9/2009 | Li et al. |
| 7,599,671 B2 | 10/2009 | Kopikare et al. |
| 7,616,935 B2 | 11/2009 | Fernandez-Corbaton et al. |
| 7,626,966 B1 | 12/2009 | Ruiter et al. |
| 7,627,025 B2 | 12/2009 | Wang et al. |
| 7,627,026 B2 | 12/2009 | Wang et al. |
| 7,636,388 B2 | 12/2009 | Wang et al. |
| 7,656,205 B2 | 2/2010 | Chen et al. |
| 7,659,003 B2 | 2/2010 | Aoki et al. |
| 7,664,085 B2 | 2/2010 | Waxman |
| 7,672,645 B2 | 3/2010 | Kilpatrick et al. |
| 7,689,190 B2 | 3/2010 | Kerth et al. |
| 7,711,004 B2 | 5/2010 | Xu |
| 7,717,342 B2 | 5/2010 | Wang |
| 7,725,118 B2 | 5/2010 | Yang et al. |
| 7,734,253 B2 | 6/2010 | Chen et al. |
| 7,777,624 B2 | 8/2010 | Wu et al. |
| 7,826,411 B2 | 11/2010 | Gonikberg et al. |
| 7,844,222 B2 | 11/2010 | Grushkevich |
| 7,849,333 B2 | 12/2010 | Schindler |
| 7,876,786 B2 | 1/2011 | Bahl et al. |
| 7,881,746 B2 | 2/2011 | Desai |
| 7,898,948 B2 * | 3/2011 | DiGirolamo et al. ......... 370/230 |
| 7,936,714 B1 | 5/2011 | Karr et al. |
| 7,957,340 B2 | 6/2011 | Choi et al. |
| 7,966,036 B2 | 6/2011 | Kojima |
| 7,983,216 B2 | 7/2011 | Iyer et al. |
| 7,995,544 B2 | 8/2011 | Benveniste |
| 8,000,715 B2 | 8/2011 | Melpignano et al. |
| 8,014,329 B2 | 9/2011 | Gong |
| 8,045,922 B2 | 10/2011 | Sherman et al. |
| 8,046,024 B2 | 10/2011 | Sudak et al. |
| 8,060,017 B2 | 11/2011 | Schlicht et al. |
| 8,072,913 B2 | 12/2011 | Desai |
| 8,073,388 B2 | 12/2011 | Grushkevich et al. |
| 8,077,652 B2 | 12/2011 | William |
| 8,078,111 B2 | 12/2011 | Jovicic et al. |
| 8,081,038 B2 | 12/2011 | Lee et al. |
| 8,085,737 B2 | 12/2011 | Zhu |
| 8,107,391 B2 | 1/2012 | Wu et al. |
| 8,121,144 B2 | 2/2012 | Bitran |
| 8,126,502 B2 | 2/2012 | Trainin |
| 8,139,670 B1 | 3/2012 | Son et al. |
| 8,140,075 B2 | 3/2012 | Watanabe |
| 8,149,715 B1 | 4/2012 | Goel |
| 8,150,328 B2 | 4/2012 | Chaudhri et al. |
| 8,159,928 B2 * | 4/2012 | Gorokhov et al. ............ 370/203 |
| 8,165,102 B1 | 4/2012 | Vleugels et al. |
| 8,170,002 B2 | 5/2012 | Wentink |
| 8,170,546 B2 | 5/2012 | Bennett |
| 8,189,506 B2 | 5/2012 | Kneckt et al. |
| 8,189,526 B2 | 5/2012 | Hsu et al. |
| 8,204,015 B2 | 6/2012 | Chaudhri et al. |
| 8,219,142 B2 | 7/2012 | Khairmode et al. |
| 8,229,087 B2 | 7/2012 | Sumioka et al. |
| 8,233,928 B2 | 7/2012 | Stanforth et al. |
| 8,254,296 B1 | 8/2012 | Lambert |
| 8,256,681 B2 | 9/2012 | Wang |
| 8,274,885 B2 | 9/2012 | Wu et al. |
| 8,274,894 B2 | 9/2012 | Kneckt et al. |
| 8,275,314 B1 | 9/2012 | Lin |
| 8,310,967 B1 | 11/2012 | Goel |
| 8,315,564 B2 | 11/2012 | Banerjea |
| 8,340,034 B1 | 12/2012 | Lee |
| 8,364,188 B2 | 1/2013 | Srinivasan et al. |
| 8,369,782 B1 | 2/2013 | Lin et al. |
| 8,442,434 B2 | 5/2013 | Grushkevich et al. |
| 8,451,776 B2 | 5/2013 | Dayal et al. |
| 8,472,427 B1 | 6/2013 | Wheeler et al. |
| 8,472,968 B1 | 6/2013 | Kim |
| 8,483,190 B2 | 7/2013 | Donovan |
| 8,493,966 B2 | 7/2013 | Bendalac |
| 8,493,992 B2 | 7/2013 | Sella et al. |
| 8,496,181 B2 | 7/2013 | Wang |
| 8,526,348 B2 | 9/2013 | Desai |
| 8,532,041 B1 | 9/2013 | Lambert et al. |
| 8,537,798 B2 | 9/2013 | Tsfati et al. |
| 8,537,799 B2 | 9/2013 | Tsfati et al. |
| 8,553,561 B1 | 10/2013 | Chokshi et al. |
| 8,571,479 B2 | 10/2013 | Banerjea |
| 8,577,305 B1 | 11/2013 | Rossi et al. |
| 8,588,705 B1 | 11/2013 | Tsui et al. |
| 8,599,814 B1 | 12/2013 | Vleugels et al. |
| 8,600,324 B1 | 12/2013 | Cousinard et al. |
| 8,619,732 B2 | 12/2013 | Khairmode et al. |
| 8,626,067 B2 | 1/2014 | Ko et al. |
| 8,649,734 B1 | 2/2014 | Lin et al. |
| 8,654,773 B2 | 2/2014 | Wentink et al. |
| 8,655,278 B2 | 2/2014 | Laroche et al. |
| 8,655,279 B2 | 2/2014 | Banerjea |
| 8,665,848 B2 | 3/2014 | Wentink |
| 8,699,430 B2 | 4/2014 | Chandramouli et al. |
| 8,730,927 B2 | 5/2014 | Thoukydides |
| 8,750,926 B2 | 6/2014 | Fu et al. |
| 8,767,616 B2 | 7/2014 | Choi et al. |
| 8,805,303 B2 | 8/2014 | Koo et al. |
| 8,811,318 B2 | 8/2014 | Jo et al. |
| 8,842,618 B2 | 9/2014 | Yu et al. |
| 8,867,481 B2 | 10/2014 | Banerjea et al. |
| 8,897,706 B1 | 11/2014 | Lin et al. |
| 8,913,599 B2 | 12/2014 | Gonikberg et al. |
| 8,923,788 B1 | 12/2014 | Cousinard et al. |
| 2002/0025810 A1 | 2/2002 | Takayama et al. |
| 2002/0049854 A1 | 4/2002 | Cox et al. |
| 2002/0102941 A1 | 8/2002 | Kuiri et al. |
| 2003/0040316 A1 | 2/2003 | Stanforth et al. |
| 2003/0148750 A1 | 8/2003 | Yan et al. |
| 2003/0198200 A1 | 10/2003 | Diener et al. |
| 2004/0044489 A1 | 3/2004 | Jones et al. |
| 2004/0063403 A1 | 4/2004 | Durrant |
| 2004/0105401 A1 | 6/2004 | Lee |

(56) References Cited

U.S. PATENT DOCUMENTS

| | | |
|---|---|---|
| 2004/0110470 A1 | 6/2004 | Tsien et al. |
| 2004/0162106 A1 | 8/2004 | Monroe et al. |
| 2004/0192222 A1 | 9/2004 | Vaisanen et al. |
| 2004/0198297 A1 | 10/2004 | Oh et al. |
| 2004/0214575 A1 | 10/2004 | Jovanovic |
| 2004/0233881 A1 | 11/2004 | Kang et al. |
| 2004/0259589 A1 | 12/2004 | Bahl et al. |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0038876 A1 | 2/2005 | Chaudhuri |
| 2005/0058151 A1 | 3/2005 | Yeh |
| 2005/0064840 A1 | 3/2005 | Heydari et al. |
| 2005/0090218 A1 | 4/2005 | Ishida et al. |
| 2005/0120119 A1 | 6/2005 | Bhanu et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0206554 A1 | 9/2005 | Yamaura |
| 2005/0215197 A1 | 9/2005 | Chen et al. |
| 2005/0250528 A1 | 11/2005 | Song et al. |
| 2005/0254423 A1 | 11/2005 | Berghoff |
| 2005/0281278 A1 | 12/2005 | Black et al. |
| 2006/0007863 A1 | 1/2006 | Naghian |
| 2006/0049880 A1 | 3/2006 | Rein et al. |
| 2006/0063509 A1 | 3/2006 | Pincu et al. |
| 2006/0079232 A1 | 4/2006 | Omori et al. |
| 2006/0114044 A1 | 6/2006 | Mintchev et al. |
| 2006/0120338 A1 | 6/2006 | Hwang et al. |
| 2006/0128308 A1 | 6/2006 | Michael et al. |
| 2006/0128347 A1 | 6/2006 | Piriyapoksombut et al. |
| 2006/0189359 A1 | 8/2006 | Kammer et al. |
| 2006/0199565 A1 | 9/2006 | Ammirata |
| 2006/0200862 A1 | 9/2006 | Olson et al. |
| 2006/0215601 A1 | 9/2006 | Vleugels et al. |
| 2006/0223474 A1 | 10/2006 | Yoshizaki et al. |
| 2006/0239443 A1 | 10/2006 | Oxford et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |
| 2006/0281404 A1 | 12/2006 | Lee et al. |
| 2006/0282541 A1 | 12/2006 | Hiroki |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0026810 A1 | 2/2007 | Love et al. |
| 2007/0077908 A1 | 4/2007 | Vorenkamp et al. |
| 2007/0081553 A1 | 4/2007 | Cicchetti et al. |
| 2007/0103829 A1 | 5/2007 | Darshan et al. |
| 2007/0109973 A1 | 5/2007 | Trachewsky |
| 2007/0142080 A1 | 6/2007 | Tanaka et al. |
| 2007/0173286 A1 | 7/2007 | Carter et al. |
| 2007/0178888 A1 | 8/2007 | Alfano et al. |
| 2007/0183443 A1 | 8/2007 | Won |
| 2007/0200622 A1 | 8/2007 | Filoramo et al. |
| 2007/0202814 A1 | 8/2007 | Ono et al. |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0238482 A1 | 10/2007 | Rayzman et al. |
| 2007/0242645 A1 | 10/2007 | Stephenson et al. |
| 2007/0264959 A1 | 11/2007 | Carrez |
| 2007/0268862 A1 | 11/2007 | Singh et al. |
| 2007/0280471 A1 | 12/2007 | Fallahi et al. |
| 2007/0286298 A1 | 12/2007 | Choi et al. |
| 2007/0297388 A1 | 12/2007 | Appaji et al. |
| 2008/0022162 A1* | 1/2008 | Qiu ................ 714/704 |
| 2008/0027033 A1 | 1/2008 | Gonda et al. |
| 2008/0045162 A1 | 2/2008 | Rofougaran et al. |
| 2008/0056201 A1 | 3/2008 | Bennett |
| 2008/0069034 A1 | 3/2008 | Buddhikot et al. |
| 2008/0076466 A1 | 3/2008 | Larsson |
| 2008/0080446 A1 | 4/2008 | Chung |
| 2008/0095058 A1 | 4/2008 | Dalmases et al. |
| 2008/0095059 A1 | 4/2008 | Chu |
| 2008/0111639 A1 | 5/2008 | Ryckaert et al. |
| 2008/0129118 A1 | 6/2008 | Diab |
| 2008/0130595 A1 | 6/2008 | Abdel-Kader |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0238679 A1 | 10/2008 | Rofougaran et al. |
| 2008/0259846 A1 | 10/2008 | Gonikberg et al. |
| 2008/0261552 A1 | 10/2008 | Chung |
| 2008/0261640 A1 | 10/2008 | Yoshida |
| 2008/0262991 A1 | 10/2008 | Kapoor et al. |
| 2008/0272818 A1 | 11/2008 | Ko |
| 2008/0279138 A1 | 11/2008 | Gonikberg et al. |
| 2008/0279162 A1 | 11/2008 | Desai |
| 2008/0279163 A1 | 11/2008 | Desai |
| 2008/0280638 A1* | 11/2008 | Malladi et al. ................ 455/522 |
| 2008/0310067 A1 | 12/2008 | Diab et al. |
| 2008/0320108 A1 | 12/2008 | Murty et al. |
| 2009/0005061 A1 | 1/2009 | Ward et al. |
| 2009/0010210 A1 | 1/2009 | Hiertz et al. |
| 2009/0030976 A1 | 1/2009 | Shukla et al. |
| 2009/0067396 A1 | 3/2009 | Fischer |
| 2009/0137206 A1 | 5/2009 | Sherman et al. |
| 2009/0143043 A1 | 6/2009 | Yoshizaki et al. |
| 2009/0147763 A1 | 6/2009 | Desai et al. |
| 2009/0168686 A1* | 7/2009 | Love et al. ................ 370/312 |
| 2009/0168725 A1* | 7/2009 | Mishra ................ 370/331 |
| 2009/0170497 A1 | 7/2009 | Miao et al. |
| 2009/0175250 A1 | 7/2009 | Mathur et al. |
| 2009/0190541 A1 | 7/2009 | Abedi |
| 2009/0196210 A1 | 8/2009 | Desai |
| 2009/0202013 A1 | 8/2009 | Sebastian |
| 2009/0209288 A1 | 8/2009 | Rofougaran |
| 2009/0235316 A1 | 9/2009 | Wu et al. |
| 2009/0239471 A1 | 9/2009 | Tran et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0268652 A1 | 10/2009 | Kneckt et al. |
| 2009/0275299 A1* | 11/2009 | Buch et al. ................ 455/161.1 |
| 2009/0280762 A1 | 11/2009 | Park et al. |
| 2009/0285264 A1 | 11/2009 | Aldana et al. |
| 2009/0291640 A1 | 11/2009 | Bhattad et al. |
| 2009/0291690 A1* | 11/2009 | Guvenc et al. ................ 455/444 |
| 2009/0311961 A1 | 12/2009 | Banerjea |
| 2009/0312027 A1 | 12/2009 | Foschini et al. |
| 2009/0321056 A1 | 12/2009 | Ran et al. |
| 2009/0325591 A1* | 12/2009 | Liu et al. ................ 455/452.2 |
| 2010/0009675 A1 | 1/2010 | Wijting et al. |
| 2010/0011231 A1 | 1/2010 | Banerjea et al. |
| 2010/0029325 A1 | 2/2010 | Wang et al. |
| 2010/0052796 A1 | 3/2010 | Menkhoff |
| 2010/0061244 A1 | 3/2010 | Meier et al. |
| 2010/0062799 A1* | 3/2010 | Ishii et al. ................ 455/522 |
| 2010/0069112 A1 | 3/2010 | Sun et al. |
| 2010/0080319 A1 | 4/2010 | Blocher et al. |
| 2010/0082957 A1 | 4/2010 | Iwata |
| 2010/0097952 A1 | 4/2010 | McHenry et al. |
| 2010/0103672 A1* | 4/2010 | Kishiyama et al. ........... 370/320 |
| 2010/0130129 A1 | 5/2010 | Chang et al. |
| 2010/0135256 A1 | 6/2010 | Lee et al. |
| 2010/0138549 A1 | 6/2010 | Goel et al. |
| 2010/0165896 A1 | 7/2010 | Gong et al. |
| 2010/0189165 A1* | 7/2010 | Xu et al. ................ 375/219 |
| 2010/0216497 A1* | 8/2010 | Kawasaki ................ 455/501 |
| 2010/0238793 A1 | 9/2010 | Alfano et al. |
| 2010/0248734 A1 | 9/2010 | Yamazaki et al. |
| 2010/0283654 A1 | 11/2010 | Waheed et al. |
| 2010/0284355 A1* | 11/2010 | Jung et al. ................ 370/329 |
| 2010/0293293 A1 | 11/2010 | Beser |
| 2010/0303026 A1 | 12/2010 | Chaudhri et al. |

(56) References Cited

U.S. PATENT DOCUMENTS

| | | |
|---|---|---|
| 2010/0316027 A1 | 12/2010 | Rick et al. |
| 2010/0322213 A1 | 12/2010 | Liu et al. |
| 2011/0002226 A1 | 1/2011 | Bhatti |
| 2011/0007675 A1 | 1/2011 | Chiou et al. |
| 2011/0009074 A1 | 1/2011 | Hsu et al. |
| 2011/0021240 A1* | 1/2011 | Hiltunen et al. ............. 455/522 |
| 2011/0026488 A1* | 2/2011 | Patel et al. .................... 370/331 |
| 2011/0053522 A1 | 3/2011 | Rofougaran et al. |
| 2011/0097998 A1 | 4/2011 | Ko et al. |
| 2011/0103363 A1 | 5/2011 | Bennett |
| 2011/0116488 A1 | 5/2011 | Grandhi |
| 2011/0161697 A1 | 6/2011 | Qi et al. |
| 2011/0164538 A1 | 7/2011 | Karr et al. |
| 2011/0188391 A1 | 8/2011 | Sella et al. |
| 2011/0194519 A1 | 8/2011 | Habetha |
| 2011/0205924 A1 | 8/2011 | Gonikberg et al. |
| 2011/0274040 A1 | 11/2011 | Pani et al. |
| 2012/0020319 A1* | 1/2012 | Song et al. .................... 370/330 |
| 2012/0025921 A1 | 2/2012 | Yang et al. |
| 2012/0087341 A1 | 4/2012 | Jang et al. |
| 2012/0099476 A1 | 4/2012 | Mahaffy et al. |
| 2012/0115420 A1 | 5/2012 | Trainin |
| 2012/0195397 A1* | 8/2012 | Sayana et al. ................ 375/340 |
| 2012/0212628 A1 | 8/2012 | Wu et al. |
| 2012/0213162 A1 | 8/2012 | Koo et al. |
| 2012/0213208 A1 | 8/2012 | Hsu et al. |
| 2012/0244805 A1 | 9/2012 | Haikonen et al. |
| 2012/0276938 A1 | 11/2012 | Wagholikar et al. |
| 2012/0294396 A1 | 11/2012 | Desai |
| 2012/0327779 A1 | 12/2012 | Gell et al. |
| 2013/0045687 A1 | 2/2013 | Banerjea |
| 2013/0045688 A1 | 2/2013 | Banerjea |
| 2013/0057344 A1 | 3/2013 | Touzard et al. |
| 2013/0114548 A1 | 5/2013 | Banerjea |
| 2013/0130684 A1 | 5/2013 | Gomes et al. |
| 2013/0176903 A1 | 7/2013 | Bijwe |
| 2013/0217401 A1* | 8/2013 | Edge et al. .................... 455/450 |
| 2013/0225068 A1 | 8/2013 | Kiminki et al. |
| 2013/0287043 A1 | 10/2013 | Nanda et al. |
| 2013/0301420 A1 | 11/2013 | Zhang et al. |
| 2014/0003318 A1 | 1/2014 | Desai |
| 2014/0004794 A1 | 1/2014 | Contaldo |
| 2014/0043966 A1 | 2/2014 | Lee et al. |
| 2014/0044106 A1 | 2/2014 | Bhagwat |
| 2014/0073251 A1 | 3/2014 | Banerjea |
| 2014/0087663 A1 | 3/2014 | Burchill et al. |
| 2014/0126552 A1 | 5/2014 | Dayal et al. |

FOREIGN PATENT DOCUMENTS

| | | |
|---|---|---|
| EP | 2299642 | 3/2011 |
| EP | 2456275 | 5/2012 |
| JP | 2006174162 | 6/2006 |
| JP | 200728568 | 2/2007 |
| JP | 2007028568 | 2/2007 |
| WO | WO-0178252 | 10/2001 |
| WO | WO-02082751 | 10/2002 |
| WO | WO-02091623 | 11/2002 |
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO2008070777 | 6/2008 |
| WO | WO-2008150122 | 12/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"Advisory Action", U.S. Appl. No. 12/646,721, Aug. 13, 2013, 3 pages.

Mazzanti, et al.,"Analysis and Design of Injection-Locked LC Dividers for Quadrature Generation", IEEE Journal of Solid-State Circuits, vol. 39, No. 9, Sep. 2004, pp. 1425-1433.

"Draft Standard for Information Technology—Telecommunications and information exchange between systems—Local and metropolitan area networks—Specific requirements", IEEE P802.11s/D1.03, Apr. 2007, 251 pages.

"Final Office Action", U.S. Appl. No. 12/358,955, Mar. 18, 2013, 12 pages.

"Final Office Action", U.S. Appl. No. 12/646,802, Nov. 15, 2012, 15 pages.

"Final Office Action", U.S. Appl. No. 12/646,721, Jun. 6, 2013, 16 pages.

"Final Office Action", U.S. Appl. No. 12/484,563, Apr. 24, 2012, 18 pages.

"Final Office Action", U.S. Appl. No. 12/616,454, Apr. 11, 2012, 19 pages.

"Final Office Action", U.S. Appl. No. 12/186,429, Oct. 13, 2011, 23 pages.

"Final Office Action", U.S. Appl. No. 12/542,845, Sep. 25, 2012, 23 pages.

"Final Office Action", U.S. Appl. No. 12/358,955, Feb. 17, 2012, 26 pages.

"Final Office Action", U.S. Appl. No. 12/487,425, May 3, 2012, 9 pages.

"Foreign Office Action", Chinese Application No. 200980122587.0, Sep. 10, 2013, 11 pages.

"Further Higher Data Rate Extension in the 2.4 GHz Band", IEEE P802.11g/D8.2,Draft Supplement to Standard [for] Information Technology, Apr. 2003, 69 pages.

Haas, et al.,"Gossip-Based Ad Hoc Routing", IEEE/ACM Transactions on Networking, vol. 14, No. 3, Jun. 2006, pp. 479-491.

"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment", IEEE Computer Society, Oct. 14, 2010, pp. 12-18, 23, 65-68.

"International Search Report and Written Opinion", PCT Application PCT/US2012/035597, Aug. 6, 2012, 13 pages.

"Non-Final Office Action", U.S. Appl. No. 12/167,841, Jul. 15, 2011, 10 pages.

"Non-Final Office Action", U.S. Appl. No. 13/099,169, Mar. 28, 2013, 12 pages.

"Non-Final Office Action", U.S. Appl. No. 13/429,090, Oct. 24, 2013, 13 pages.

"Non-Final Office Action", U.S. Appl. No. 12/484,563, Oct. 4, 2011, 13 pages.

"Non-Final Office Action", U.S. Appl. No. 12/732,036, Aug. 9, 2012, 13 pages.

"Non-Final Office Action", U.S. Appl. No. 13/479,124, Sep. 27, 2013, 14 pages.

"Non-Final Office Action", U.S. Appl. No. 12/646,721, Nov. 7, 2012, 15 pages.

"Non-Final Office Action", U.S. Appl. No. 12/646,721, May 10, 2012, 15 pages.

"Non-Final Office Action", U.S. Appl. No. 12/235,333, Jun. 28, 2011, 16 pages.

"Non-Final Office Action", U.S. Appl. No. 12/646,802, Mar. 29, 2012, 16 pages.

"Non-Final Office Action", U.S. Appl. No. 12/883,054, Nov. 22, 2013, 18 pages.

"Non-Final Office Action", U.S. Appl. No. 12/186,429, Apr. 25, 2011, 19 pages.

"Non-Final Office Action", U.S. Appl. No. 12/542,845, Apr. 4, 2012, 19 pages.

"Non-Final Office Action", U.S. Appl. No. 12/358,955, Sep. 6, 2011, 24 pages.

"Non-Final Office Action", U.S. Appl. No. 12/542,845, Oct. 23, 2013, 29 pages.

"Non-Final Office Action", U.S. Appl. No. 12/358,955, Aug. 20, 2012, 33 pages.

"Non-Final Office Action", U.S. Appl. No. 12/487,425, Jan. 12, 2012, 7 pages.

"Non-Final Office Action", U.S. Appl. No. 12/616,454, Dec. 22, 2011, 8 pages.

(56) References Cited

OTHER PUBLICATIONS

"Non-Final Office Action", U.S. Appl. No. 13/249,740, Mar. 26, 2013, 9 pages.
"Non-Final Office Action", U.S. Appl. No. 13/249,740, Oct. 16, 2013, 9 pages.
"Non-Final Office Action", U.S. Appl. No. 13/099,169, Oct. 4, 2013, 9 pages.
"Notice of Allowance", U.S. Appl. No. 12/167,841, Nov. 25, 2011, 11 pages.
"Notice of Allowance", U.S. Appl. No. 12/616,454, Aug. 22, 2012, 4 pages.
"Notice of Allowance", U.S. Appl. No. 12/235,333, Nov. 15, 2011, 5 pages.
"Notice of Allowance", U.S. Appl. No. 13/604,563, Sep. 26, 2013, 5 pages.
"Notice of Allowance", U.S. Appl. No. 12/484,563, Jul. 9, 2012, 6 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Notice of Allowance", U.S. Appl. No. 12/358,955, Jul. 1, 2013, 8 pages.
"Notice of Allowance", U.S. Appl. No. 12/186,429, Jun. 6, 2013, 9 pages.
"Notice of Allowance", U.S. Appl. No. 12/487,425, Jul. 26, 2013, 9 pages.
"Part 11: Wireless LAN Medium Access Control (MAC) and Physical Layer (PHY) specifications", IEEE Std 802.11b-1999/Cor 1-2001,Amendment 2: Higher-speed Physical Layer (PHY) extension in the 2.4 GHz band, Nov. 7, 2001, 23 pages.
"Part 11: Wireless LAN Medium Access Control (MAC) and Physical Layer (PHY) specifications", IEEE Std 802.11a-1999,High-speed Physical Layer in the 5 GHz Band, 1999, 91 pages.
"PCT Search Report and Written Opinion", Application No. PCT/US2013/025144, Jun. 5, 2013, 10 pages.
"PCT Search Report and Written Opinion", Application No. PCT/US2011/054358, Dec. 16, 2011, 13 pages.
"PCT Search Report and Written Opinion", Application No. PCT/IB2013/000390, Aug. 21, 2013, 19 Pages.
"Restriction Requirement", U.S. Appl. No. 12/167,841, May 12, 2011, 6 pages.
"Supplemental Notice of Allowance", U.S. Appl. No. 12/186,429, Jul. 10, 2013, 2 pages.
"Supplemental Notice of Allowance", U.S. Appl. No. 12/323,292, Oct. 17, 2013, 2 pages.
"Supplemental Notice of Allowance", U.S. Appl. No. 12/323,292, Oct. 7, 2013, 2 pages.
"Supplemental Notice of Allowance", U.S. Appl. No. 13/656,482, Nov. 29, 2013, 2 pages.
"Supplemental Notice of Allowance", U.S. Appl. No. 12/716,569, Jul. 23, 2012, 2 pages.
"Supplemental Notice of Allowance", U.S. Appl. No. 12/358,955, Oct. 11, 2013, 3 pages.
Mujtaba "TGn Sync Proposal Technical Specification", IEEE 802.11-04/0889r6,This document presents the technical specification for the MAC and the PHY layer of the TGn Sync proposal to IEEE 802.11 TGn, May 18, 2005, pp. 1-131.
Mujtaba "TGn Sync Proposal Technical Specification", IEEE 802.11-04 / Wireless LANs, May 2005, pp. 1-131.
Jung, et al.,"A Power Control MAC Protocol for Ad Hoc Networks", Wireless Networks ; The Journal of Mobile Communication, Computation and Information, Kluwer Academic Publishers vol. 11, No. 1-2, Jan. 1, 2005, 12 Pages.
"Foreign Notice of Allowance", Japanese Application No. 2011-513586, Jul. 16, 2013, 2 pages.
Qiao, et al.,"Interference Analysis and Transmit Power Control in IEEE 802.11a/h Wireless LANs", IEEE / ACM Transactions on Networking, IEEE / ACM, New York, NY, US, vol. 15. No. 5, Oct. 1, 2007, 14 Pages.

"Notice of Allowance", U.S. Appl. No. 13/656,502, Jun. 25, 2013, 11 pages.
"Notice of Allowance", U.S. Appl. No. 12/323,292, Jun. 28, 2013, 8 pages.
"Notice of Allowance", U.S. Appl. No. 13/656,482, Sep. 3, 2013, 8 pages.
Tinnirello, et al.,"Revisit of RTS / CTS Exchange in High-Speed IEEE 802.11 Networks", World of Wireless Mobile and Multimedia Networks. 2005. Wowmom 2005. Sixth IEEE International Symposium on a Taormina-Giardini Naxos, Italy Jun. 13-16, 2005 Piscataway, NJ, USA,IEEE, Los Alamitos, CA, USA, Jun. 13, 2005, 10 Pages.
"Search Report", European Application No. 13169350.9, Aug. 13, 2013, 10 Pages.
"Supplemental Notice of Allowance", U.S. Appl. No. 12/759,336, Aug. 14, 2013, 2 pages.
Jung, et al., "A Power Control MAC Protocol for Ad Hoc Networks", In Proceedings of MOBICOM 2002, Sep. 23, 2002, pp. 36-47.
"Advisory Action", U.S. Appl. No. 12/190,251, Dec. 7, 2011, 3 pages.
"Final Office Action", U.S. Appl. No. 12/759,336, Feb. 25, 2013, 11 pages.
"Final Office Action", U.S. Appl. No. 12/534,361, Feb. 29, 2012, 13 pages.
"Final Office Action", U.S. Appl. No. 12/190,251, Sep. 13, 2011, 15 pages.
"Final Office Action", U.S. Appl. No. 12/323,292, Aug. 24, 2012, 26 pages.
"Foreign Office Action", Chinese Application No. 200980122587.0, Feb. 21, 2013, 17 pages.
"Foreign Office Action", European Patent Application No. 09789754.0, Mar. 11, 2013, 4 Pages.
"Foreign Office Action", Japanese Application No. 2011-513586, Apr. 9, 2013, 4 Pages.
"Foreign Office Action", European Patent Application No. 09789754.0, Jul. 12, 2012, 4 pages.
"Foreign Office Action", Japanese Application No. 2011-513586, Oct. 23, 2012, 7 pages.
"Foreign Office Action", EP Application No. 09789754.0, May 17, 2011, 8 pages.
"Information Technology—Telecommunications and Information Exchange Between systems—Local and Metropolitan Area Networks—Specific Requirements", IEEE Standard, Aug. 1, 2005, pp. 1-60.
"Information Technology—Telecommunications and Information Exchange between Systems—Local and Metropolitan Area Networks—Specific Requirements", Part 11: Wireless LAN Medium Access Control (MAC) and Physical Layer (PHY) Specifications, IEEE Standard 802.11h-2003 (Amendment to IEEE Std 802.11-1993), Oct. 14, 2003, 80 pages.
"Non-Final Office Action", U.S. Appl. No. 12/534,361, Oct. 12, 2011, 11 pages.
"Non-Final Office Action", U.S. Appl. No. 12/190,251, Mar. 29, 2012, 11 pages.
"Non-Final Office Action", U.S. Appl. No. 12/759,336, Oct. 4, 2012, 13 pages.
"Non-Final Office Action", U.S. Appl. No. 12/323,292, Dec. 21, 2011, 17 pages.
"Non-Final Office Action", U.S. Appl. No. 12/478,446, Dec. 28, 2011, 17 pages.
"Non-Final Office Action", U.S. Appl. No. 13/656,482, Mar. 19, 2013, 19 pages.
"Non-Final Office Action", U.S. Appl. No. 13/656,502, Feb. 21, 2013, 6 pages.
"Non-Final Office Action", U.S. Appl. No. 13/604,563, Apr. 5, 2013, 6 pages.
"Non-Final Office Action", U.S. Appl. No. 12/190,240, Jan. 6, 2012, 7 pages.
"Non-Final Office Action", U.S. Appl. No. 12/190,251, Mar. 29, 2011, 8 pages.
"Notice of Allowance", U.S. Appl. No. 12/534,361, Feb. 14, 2013, 12 pages.

(56) References Cited

OTHER PUBLICATIONS

"Notice of Allowance", U.S. Appl. No. 12/190,240, May 16, 2012, 4 pages.
"Notice of Allowance", U.S. Appl. No. 12/190,251, Oct. 4, 2012, 6 pages.
"Notice of Allowance", U.S. Appl. No. 12/478,446, Jun. 14, 2012, 6 pages.
"Notice of Allowance", U.S. Appl. No. 12/759,336, May 3, 2013, 9 pages.
"Part 11: Wireless LAN Medium Access Control (MAC) and Physical Layer (PHY) specifications", Information technology—Telecommunications and information exchange between systems—Local and metropolitan area networks—Specific requirements—,IEEE, Apr. 2003, pp. 1-69.
"PCT Search Report", Application No. PCT/US2009/046289, Oct. 29, 2009, 13 pages.
"Supplemental Notice of Allowance", U.S. Appl. No. 12/759,336, Jun. 5, 2013, 2 pages.
"Supplemental Notice of Allowance", U.S. Appl. No. 12/759,336, Jun. 18, 2013, 2 pages.
"Foreign Office Action", CN Application No. 200980122587.0, Jan. 24, 2014, 10 Pages.
"International Search Report and Written Opinion", Application No. PCT/IB2013/001962, Feb. 6, 2014, 11 Pages.
"Non-Final Office Action", U.S. Appl. No. 13/757,276, Jan. 30, 2014, 9 pages.
"Supplemental Notice of Allowance", U.S. Appl. No. 13/656,482, Dec. 19, 2013, 2 pages.
"Final Office Action", U.S. Appl. No. 12/883,054, Jun. 9, 2014, 22 pages.
"Foreign Office Action", CN Application No. 200980122587.0, Jul. 3, 2014, 12 Pages.
"Foreign Office Action", EP Application No. 13169350.9, May 9, 2014, 3 Pages.
"Non-Final Office Action", U.S. Appl. No. 13/458,227, Jul. 3, 2014, 10 pages.
"Non-Final Office Action", U.S. Appl. No. 13/536,506, Apr. 25, 2014, 12 pages.
"Non-Final Office Action", U.S. Appl. No. 14/018,232, Aug. 13, 2014, 6 pages.
"Non-Final Office Action", U.S. Appl. No. 14/082,981, Aug. 4, 2014, 6 pages.
"Non-Final Office Action", U.S. Appl. No. 14/089,515, May 13, 2014, 9 pages.
"Notice of Allowance", Application No. 13/757,276, Jul. 8, 2014, 6 pages.
"Notice of Allowance", U.S. Appl. No. 14/089,515, Aug. 21, 2014, 4 pages.
"Non-Final Office Action", U.S. Appl. No. 12/883,054, Sep. 11, 2014, 29 pages.
"Non-Final Office Action", U.S. Appl. No. 13/622,916, Sep. 10, 2014, 10 pages.
"Non-Final Office Action", U.S. Appl. No. 14/063,972, Sep. 24, 2014, 6 pages.
"Notice of Allowance", U.S. Appl. No. 13/536,506, Sep. 19, 2014, 7 pages.
"Notice of Allowance", U.S. Appl. No. 14/018,232, Nov. 5, 2014, 7 pages.
"Notice of Allowance", U.S. Appl. No. 14/063,972, Nov. 7, 2014, 8 pages.
"Supplemental Notice of Allowance", U.S. Appl. No. 13/757,276, Oct. 24, 2014, 2 pages.
"Corrected Notice of Allowance", U.S. Appl. No. 14/063,972, Jan. 26, 2015, 2 pages.
"Foreign Office Action", CN application No. 200980122587.0, Dec. 3, 2014, 10 pages.
"Non-Final Office Action", U.S. Appl. No. 13/761,949, Jan. 12, 2015, 16 pages.
"Non-Final Office Action", U.S. Appl. No. 14/082,981, Feb. 13, 2015, 13 pages.
"Notice of Allowance", U.S. Appl. No. 12/883,054, Feb. 9, 2015, 12 pages.
"Notice of Allowance", U.S. Appl. No. 13/458,227, Jan. 2, 2015, 7 pages.

* cited by examiner

LOCATION-BASED DETECTION OF INTERFERENCE IN CELLULAR COMMUNICATIONS SYSTEMS

RELATED APPLICATIONS

This application is a continuation of and claims priority to U.S. Utility patent application Ser. No. 12/534,361, filed Aug. 3, 2009, which claims priority under 35 U.S.C. §119(e) to U.S. Provisional Patent Application Ser. No. 61/087,842, filed on Aug. 11, 2008, the disclosure of which is incorporated by reference herein in its entirety.

BACKGROUND

Use of cellular devices has become commonplace. Generally, in a cellular communications system, multiple base stations are set up that each provide a separate area of coverage. Each separate area of coverage is commonly referred to as a cell. Mobile devices that are physically located within a particular cell communicate with the base station responsible for that cell. Situations can arise, however, in which signals from a mobile device physically located in one cell are received by a base station responsible for a different cell. These signals can be a source of interference for other mobile devices communicating with that base station.

SUMMARY

A method implemented in a first cellular base station located within a cell is described. The method includes analyzing signals received from a mobile device to identify when interference for the mobile device exceeds a threshold amount, the mobile device being managed by the first cellular base station. The method further includes, in response to the interference for the mobile device exceeding the threshold amount, determining a location of the mobile device in the cell, and determining a neighboring cell generating the interference for the mobile device based on the location of the mobile device in the cell.

A computing device of a cellular base station is also described. The computing device includes a communicator to receive signals from multiple mobile devices being managed by the cellular base station; an analyzer to analyze the signals and identify when signals from one or more of the multiple mobile devices are being interfered with by greater than a threshold amount; and a locator to determine, based on a location of the one or more mobile devices, a cell responsible for the interference.

Another method implemented in a first cellular base station is also described, and includes identifying when interference in signals received from a mobile device exceeds a threshold amount, the mobile device being located in a first cell being managed by the first cellular base station; determining a second cell closest to the mobile device; and requesting that a second cellular base station that manages the second cell attempt to reduce the interference.

BRIEF DESCRIPTION OF THE DRAWINGS

The same numbers are used throughout the drawings to reference like features.

DETAILED DESCRIPTION

Location-based detection of interference in cellular communications systems is discussed herein. Generally, a base station responsible for managing mobile devices for a cell in a cellular communications system analyzes signals received from the mobile devices that base station is managing. The base station determines, based on a signal-to-noise ratio value or other interference measurement calculated for signals received from a mobile device, whether interference in the signal received from the mobile device exceeds a threshold amount. This threshold amount can be exceeding of a particular value for a particular amount of time. If the interference exceeds the threshold amount, then the base station determines that the mobile device is being interfered with by one or more mobile devices in another cell. In response, the base station determines a closest neighboring cell of the mobile device being interfered with, and communicates a request to the base station responsible for managing mobile devices in that neighboring cell. The request that is sent requests that the base station responsible for managing mobile devices in that neighboring cell reduce the interference being generated by the mobile devices in that neighboring cell.

Figure 1:
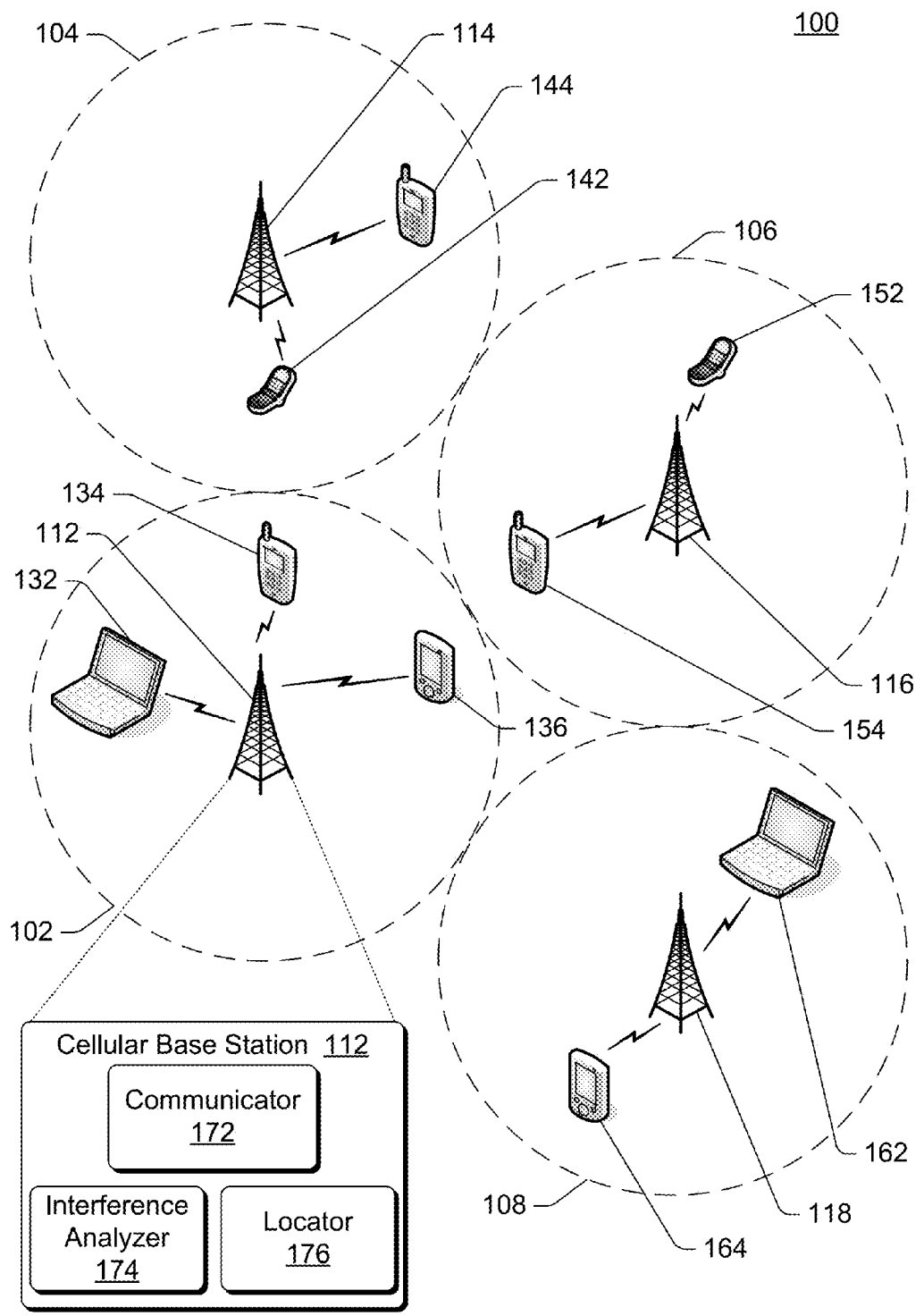
FIG. 1 illustrates an example cellular communications system implementing the location-based detection of interference in cellular communications systems.

FIG. 1 illustrates an example cellular communications system 100 implementing the location-based detection of interference in cellular communications systems in accordance with one or more embodiments. System 100 includes four cells 102, 104, 106, and 108. For ease of explanation, only four cells are illustrated in FIG. 1. However, cellular communications system 100 can include a different number of cells. A cellular communications system 100 can be implemented using a variety of different conventional technologies and/or protocols, such as any of the GSM (Global System for Mobile Communications)-based systems, CDMA (Code Division Multiple Access)-based systems, AMPS (Advanced Mobile Phone System)-based systems, and so forth.

Within each cell 102, 104, 106, and 108 is a cellular base station 112, 114, 116, and 118, respectively. Each cell represents a geographic or physical area covered or managed by the cellular base station within that cell. The size and shape of each cell can vary based on, for example, the technologies and/or protocols used by the cellular base stations, the power of the cellular base stations, the physical terrain of the area covered by the cellular base station, interfering signals received from other sources within and/or external to the cell, and so forth.

Mobile devices are located within different cells and can move between cells. In the example of FIG. 1, mobile devices 132, 134, and 136 are located within cell 102, mobile devices 142 and 144 are located within cell 104, mobile devices 152 and 154 are located within cell 106, and mobile devices 162 and 164 are located within cell 108. Each of these mobile devices can be a variety of different computing devices capable of wireless communication with a cellular base station. For example, a mobile device can be a cellular phone, a car phone, a personal digital assistant (PDA), a laptop or other portable computer, an automotive PC, and so forth. Additionally, the mobile devices are referred to as being mobile due to their ability to maintain communication with a cellular base station of system 100 as the mobile devices transition from one cell to another. However, such mobile devices need not be moved and can remain stationary in a particular location.

The cellular base station in a cell is responsible for handling or managing mobile devices in that cell. The managing of a mobile device refers to the cellular base station coordinating various communications desired by the mobile device. These communications can take a variety of different forms, such as phone calls, email or other messages, Internet or other network data transfers, and so forth. As part of managing a mobile device, the cellular base station receives data from the mobile device and forwards such data to the appropriate destination, and also receives data targeting the mobile device and communicates such data to the mobile device. To facilitate these communications, the managing provided by the cellular base station also includes communicating control information to the mobile device and/or receiving control information from the mobile device.

As a mobile device moves within a cell, the cellular base station for that cell maintains responsibility for managing that mobile device. However, when a mobile device moves into a neighboring cell, responsibility for managing that mobile device is transferred to the cellular base station of that neighboring cell. For example, as a mobile device moves within cell 102, responsibility for managing a mobile device remains with cellular base station 112. However, if the mobile device were to move into cell 108, then responsibility for managing the mobile device is transferred to cellular base station 118. The cellular base stations communicate with one another to coordinate such transfers of responsibility.

Although cells are not illustrated as overlapping in FIG. 1, it is to be appreciated that different cells in cellular communications system 100 can overlap one another. The cellular base stations responsible for managing mobile devices within overlapping cells communicate with one another and determine, in accordance with the protocol implemented by cellular communications system 100, which of the cellular base stations is responsible for managing the mobile device in an area that is overlapped by multiple cells.

Cellular base stations can support a variety of different protocols and/or techniques to allow such requests and other information to be communicated among the cellular base stations. In one or more embodiments, requests and other information can be communicated among the cellular base stations via an X2 link protocol supported by cellular base stations using the 3GPP LTE ($3^{rd}$ Generation Partnership Project Long Term Evolution) standard.

Each mobile device in a cell communicates with the cellular base station for that cell. This communication includes the mobile device sending signals to the cellular base station (also referred to as an uplink), as well as receiving signals from the cellular base station (also referred to as a downlink). Although a particular cellular base station expects to receive signals from mobile devices that the cellular base station is responsible for managing, situations can arise in which a cellular base station also receives signals from other mobile devices in other cells that the cellular base station is not responsible for managing. Signals received by a cellular base station from a mobile device that the cellular base station is not responsible for managing are also referred to as interference for the cellular base station as such signals can interfere with the signals received from mobile devices that the cellular base station is responsible for managing. For example, cellular base station 112 is responsible for managing mobile devices 132, 134, and 136. However, cellular base station 112 can also receive signals sent by other mobile devices, such as mobile device 142 and 154. Signals that cellular base station 112 receives from mobile devices 142 and 154 are referred to as interference (from the perspective of cellular base station 112, mobile device 136, and cell 102).

A cellular base station employs an interference detection technique to detect which other surrounding cell(s) include mobile devices that are causing interference to a mobile device managed by the cellular base station. For example, if cellular base station 112 detects that signals received from mobile device 136 are being interfered with by a threshold amount, then cellular base station 112 detects which other cell 104, 106, or 108 includes one or more mobile devices that are generating this interference.

FIG. 1 illustrates cellular base station 112 in additional detail. Only one cellular base station is shown in additional detail in FIG. 1 in order to avoid cluttering the drawings, although it is to be appreciated that the other cellular base stations 114, 116, and 118 are analogous to cellular base station 112. Cellular base station 112 includes a communicator 172, an interference analyzer 174, and a locator 176. Communicator 172, interference analyzer 174, and locator 176 can be implemented in software, firmware, hardware, or combinations thereof.

Communicator 172 manages communications with mobile devices in cell 102 as well as communications with cellular base stations in other cells. Communicator 172 manages receiving signals from mobile devices in cell 102, sending signals to mobile devices in cell 102, receiving requests from cellular base stations in other cells, sending requests to cellular base stations in other cells, and so forth.

During operation, communicator 172 generates measurements of interference in the signals received from each of the mobile devices in cell 102. In one or more embodiments, these measurements of interference are signal-to-noise ratio (SNR) measurements, each of which is a measure of the power of the intended signal from a mobile device relative to interference with that intended signal when the signal is received. The signal-to-noise ratio measurements can be generated using conventional techniques, and are used by communicator 172 in managing the mobile devices in cell 102. Additionally, the signal-to-noise ratio measurements (or other measures of interference generated by communicator 172) are leveraged by the location-based detection of interference in cellular communications systems and used to reduce interference in certain situations as discussed in more detail below.

Interference analyzer 174 obtains the measurements of interference (e.g., signal-to-noise ratio measurements) generated by communicator 172 for the mobile devices in cell 102 and analyzes these obtained measurements. In one embodiment, analyzer 174 analyzes these obtained measurements of interference and determines when the interference for a particular mobile device exceeds a threshold amount. The interference can be determined to exceed the threshold amount when, for example, the interference exceeds a particular value for a particular amount of time.

In situations when interference analyzer 174 determines that the interference for a particular mobile device exceeds the threshold amount, locator 176 determines the neighboring cell that is responsible for the interference. The neighboring cell that is responsible for the interference is the neighboring cell that includes one or more mobile devices that are sending signals that are causing interference. This neighboring cell is determined based at least in part on the location of the particular mobile device for which measurements of interference exceeds a threshold amount, as discussed in more detail below.

With the neighboring cell that is responsible for the interference having been determined, communicator 172 sends a request to the cellular base station responsible for managing mobile devices in that neighboring cell. This request is a request for the cellular base station responsible for managing devices in that neighboring cell to take action to reduce the interference being generated by the devices in that neighboring cell.

In addition to communicator 172, interference analyzer 174, and locator 176, cellular base station 112 can include various additional well-known components and/or modules. These additional components and/or modules provide various functionality for cellular base station 112 in managing mobile devices in cell 102. These additional components and/or modules, however, have not been shown in FIG. 1 in order to avoid cluttering the drawings.

Figure 2:
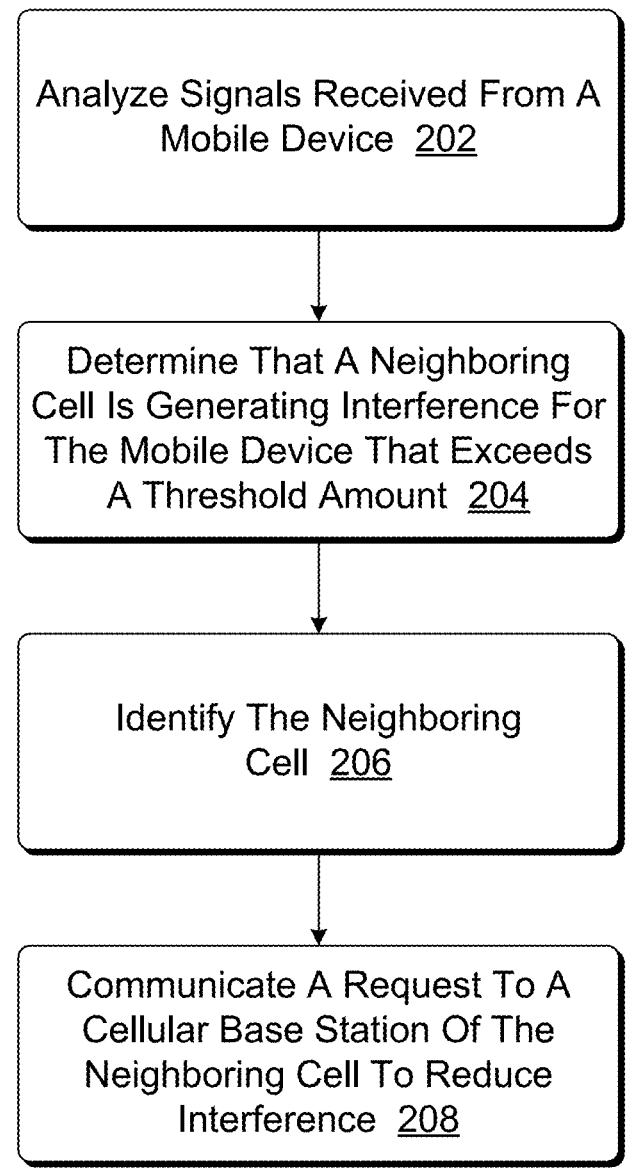
FIG. 2 is a flowchart illustrating an example process for implementing the location-based detection of interference in cellular communications systems.

FIG. 2 is a flowchart illustrating an example process 200 for implementing the location-based detection of interference in cellular communications systems in accordance with one or more embodiments. Aspects of process 200 may be implemented in hardware, firmware, software, or a combination thereof. Process 200 is described in the form of a set of blocks that specify operations to be performed, and the operations are not necessarily limited to the order shown. The operations performed by the set of blocks in process 200 are performed by a cellular base station, such as a cellular base station 112, 114, 116, or 118 of FIG. 1. Process 200 is discussed with additional reference to FIG. 1.

At block 202 an interference analyzer (such as interference analyzer 174 of FIG. 1) analyzes signals received from a mobile device. The analysis in block 202 is an analysis of the measurements of interference (e.g., the signal-to-noise ratio measurements) obtained from a communicator (such as communicator 172 of FIG. 1). In one or more embodiments, the analysis in block 202 is performed for each mobile device that the cellular base station implementing process 200 is responsible for managing, although alternatively the analysis in block 202 may not be performed for certain mobile devices.

The analysis in block 202 determines whether the interference for the mobile device exceeds a threshold amount. In one or more embodiments, the analysis in block 202 includes determining if the measurements of interference for the mobile device obtained from the communicator indicate that the interference exceeds a particular value for a particular amount of time. This particular amount of time can vary, for example, by being dependent on how much the interference exceeds the particular value and/or whether interference for other mobile devices also exceeds the particular value. For example, if the interference exceeds the particular value by greater than a certain percentage or certain amount, then the particular amount of time can be reduced. By way of another example, if multiple other mobile devices (optionally other mobile devices within a threshold distance of the mobile device) also have measurements of interference that exceed the particular value, then the particular amount of time can be reduced.

Based on the analysis in block 202, at block 204 the interference analyzer determines when a neighboring cell is generating interference for a mobile device that exceeds the threshold amount. The interference analyzer makes this determination in one or more of a variety of different manners. In one or more embodiments, the interference analyzer determines that a neighboring cell is generating interference for a mobile device that exceeds a threshold amount when the interference analyzer determines in block 202 that the measurements of interference obtained from the communicator for the mobile device exceed a particular value for a particular amount of time. This particular amount of time is identified in one or more of a variety of different manners, such as a particular number of consecutive interference measurements exceeding the particular value, or a particular percentage (e.g., one-half or two-thirds) of a particular number of consecutive interference measurements exceeding the particular value.

At block 206, a locator (such as locator 176 of FIG. 1) identifies the particular neighboring cell that is generating the interference. The locator identifies the neighboring cell that is generating the interference based on the location of the mobile device for which the interference exceeding the threshold amount was determined to have been generated. In one or more embodiments, the locator identifies the neighboring cell that is closest to the mobile device for which the interference has been determined to exceed a threshold amount as the neighboring cell that is generating the interference. The locator identifies this neighboring cell that is closest to the mobile device in one or more of a variety of different manners. Typically, the locator is aware of the location of each mobile device in cell 102 that cellular base station 112 is responsible for managing. The locator identifies the particular location of a mobile device in cell 102 in one or more of a variety of different manners, such as by tracking (e.g., triangulating on) the signals sent by the mobile device, receiving an indication of the location of the device (e.g., global positioning system (GPS) coordinates) from the device, and so forth. The locator can track these locations, or alternatively can access another component or module that tracks or otherwise obtains these locations.

Additionally, the locator is aware of the topology of the cells in cellular communications system 100. This topology refers to the locations of the different cells (and/or cellular base stations) in system 100. The locator identifies this topology in a variety of different manners, such as by obtaining an indication of the topology from an administrator or developer of system 100, by obtaining identifications of the locations of the cellular base stations from the cellular base stations, and so forth.

Given the location of the mobile device for which the interference has been determined to exceed the threshold amount and the topology of the cells in cellular communications system 100, the locator readily identifies the neighboring cell that is physically closest to the mobile device for which the interference has been determined to exceed the threshold amount. The locator makes this identification, for example, by identifying the cell (or cellular base station) that is physically closest to the mobile device for which the interference has been determined to exceed the threshold amount.

In other embodiments, the locator identifies the neighboring cell that is closest to the mobile device in other manners. For example, the locator can identify the neighboring cell that is closest to the mobile device based on a direction. The locator identifies the location of the mobile device for which the interference has been determined to exceed the threshold amount as discussed above. Additionally, the locator identifies a direction of that mobile device from the cellular base station responsible for managing the device (e.g., cellular base station 112). The locator knows the location of the cellular base station, and given the location of the mobile device the locator readily identifies this direction. Based on the topology of the cells in cellular communications system 100 and following a path from the cellular base station to the mobile device and continuing beyond the mobile device, the locator determines that the next cell encountered in that direction is the neighboring cell that is generating the interference.

In block 208, the communicator sends a request to the cellular base station of the neighboring cell identified in block 206 to reduce the interference. In one or more embodiments, the request to reduce interference is also referred to as an overload indicator (OI). In response to the request, the cellular base station receiving the request can attempt to reduce the interference by altering the operation of one or more of the mobile devices it manages in a variety of different conventional manners. For example, the cellular base station can attempt to reduce interference by requesting that one or more mobile devices in the cell managed by the cellular base station reduce their transmitting power, by altering the scheduling of when signals are sent by one or more mobile devices in the cell managed by the cellular base station, and so forth.

The cellular base station receiving the request can attempt to reduce interference from all mobile devices in the cell managed by that cellular base station, or alternatively only in particular mobile devices. For example, the cellular base station receiving the request can identify one or more mobile devices in the cell managed by that cellular base station that are close to (e.g., within a particular distance of) a cell managed by the cellular base station from which the request was received. The cellular base station receiving the request readily identifies the mobile devices close to the cell based on the location of those mobile devices as well as the topology of the cells in the cellular communications system and the cellular base station from which the request to reduce interference was received. A cellular base station can attempt to reduce interference from mobile devices that are within a threshold distance of the cell managed by the cellular base station from which the request was received, but not from other mobile devices. For example, if cellular base station 116 receives a request from cellular base station 112 to reduce interference, cellular base station 116 can attempt to reduce interference from mobile device 154 (which can be determined as being close to cell 102). However, cellular base station 112 need not attempt to reduce interference from mobile device 152 (e.g., the operation of mobile device 152 can remain unchanged).

Figure 3:
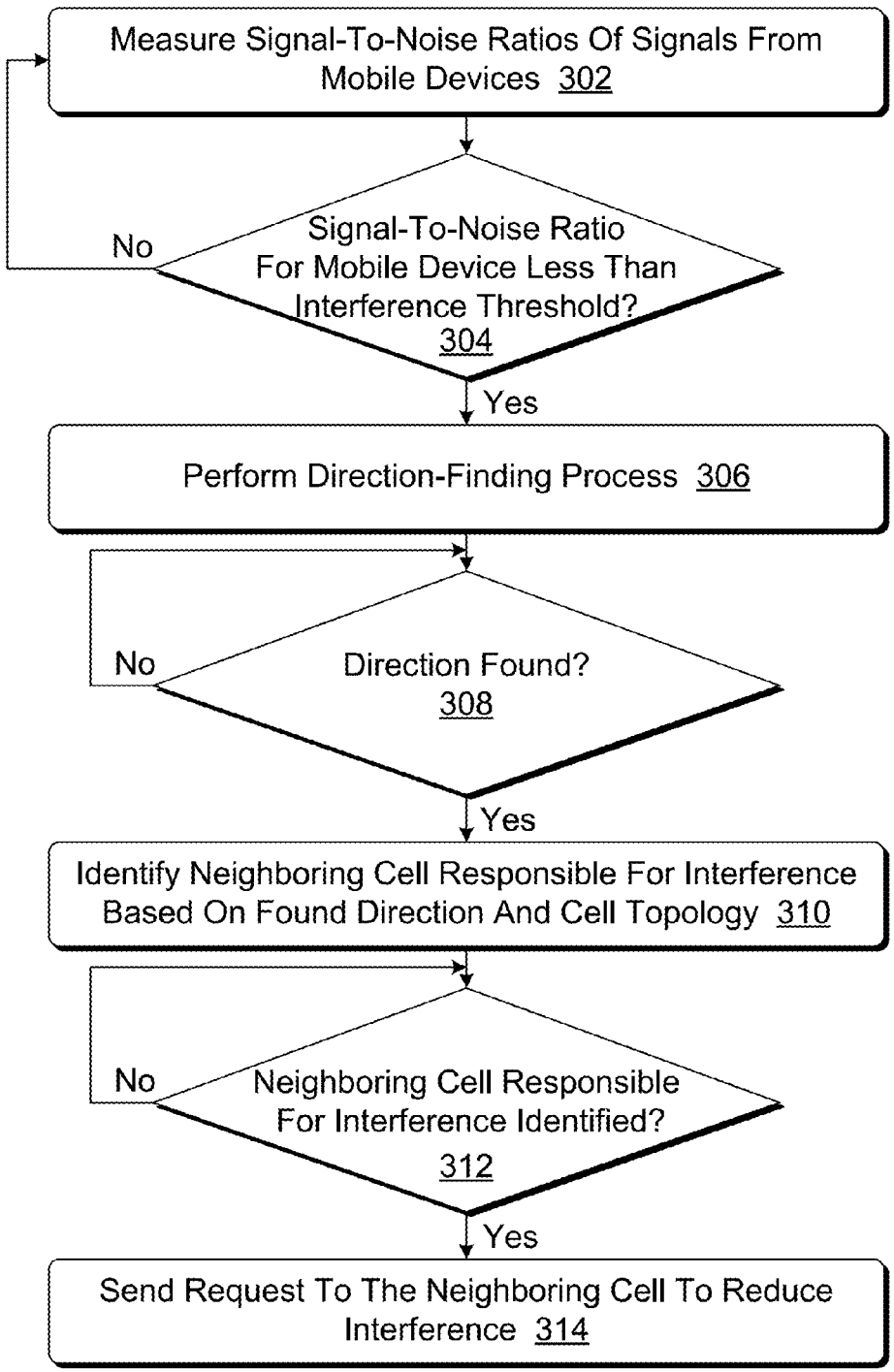
FIG. 3 is a flowchart illustrating another example process for implementing the location-based detection of interference in cellular communications systems.

FIG. 3 is a flowchart illustrating another example process 300 for implementing the location-based detection of interference in cellular communications systems in accordance with one or more embodiments. Aspects of process 300 may be implemented in hardware, firmware, software, or a combination thereof. Process 300 is described in the form of a set of blocks that specify operations to be performed, and the operations are not necessarily limited to the order shown. The operations performed by the set of blocks in process 300 are performed by a cellular base station, such as a cellular base station 112, 114, 116, or 118 of FIG. 1. Process 300 is discussed with additional reference to FIG. 1.

In block 302, a communicator (such as communicator 172 of FIG. 1) measures signal-to-noise ratios of signals received from mobile devices.

In block 304, an interference analyzer (such as interference analyzer 174 of FIG. 1) checks whether the signal-to-noise ratio measurement for a mobile device is less than an interference threshold. It is to be appreciated that higher signal-to-noise ratio measurements indicate less interference than lower signal-to-noise ratio measurements. Accordingly, the signal-to-noise ratio being less than an interference threshold indicates that the interference exceeds a threshold amount.

The interference threshold is one or more of a variety of different values that are established in a variety of different manners that vary by implementation. In one or more embodiments, a particular interference threshold is established by weighing the desire to detect interference from one or more mobile devices of one or more neighboring cells against the desire to avoid false positives (e.g., avoiding identifying interference from another source as being interference from or more mobile devices of one or more neighboring cells). For example, the interference threshold can be determined empirically based on administrators or other users or devices analyzing the operation of the cellular base stations and signals received from the mobile devices.

Additionally, in one or more embodiments the interference analyzer determines that the signal-to-noise ratio is less than the interference threshold 304 based on multiple measurements of signals received from a mobile device. The frequency with which signal-to-noise ratio measurements are made can vary based on the technology and/or protocol implemented by the cellular base station. For example, the signal-to-noise ratio measurements can be made 15 times every 10 milliseconds (ms). In order for the signal-to-noise ratio measurements to be less than the interference threshold, the signal-to-noise ratio measurements are to indicate that the interference exceeds a particular value for a particular amount of time. The signal-to-noise ratio measurements can indicate that the interference exceeds a particular value by the signal-to-noise ratio measurements being less than a particular value. This particular amount of time can be, for example, a particular number of consecutive measurements that are to be less than the particular value, at least a particular percentage of consecutive measurements are to be less than the particular value, and so forth. For example, this particular amount of time can indicate that five consecutive signal-to-noise ratio measurements are to be less than the particular value. By way of another example, this particular amount of time can indicate that one-half or two-thirds of any 15 consecutive signal-to-noise ratio measurements are to be less than the particular value. This particular amount of time can also vary as discussed above, such as being dependent on how much the signal-to-noise ratio measurements are below the particular value and/or whether signal-to-noise ratio measurements for other mobile devices are less than the interference threshold.

The interference analyzer checks the signal-to-noise ratio measurements of signals received from the mobile devices until the signal-to-noise ratio measurements for a mobile device are less than the interference threshold. In block 306, when the interference analyzer determines that the signal-to-noise ratio measurements from a mobile device are less than the interference threshold, then a locator (such as locator 176 of FIG. 1) performs a direction-finding process. The direction-finding process identifies a direction, relative to the cellular base station implementing process 300, where the mobile device for which the signal-to-noise ratio measurements were determined to be less than the interference threshold in block 304 is located. This direction is determined based on the location of the cellular base station and the mobile device as discussed above.

The direction-finding process continues until the direction is found. In block 310, the locator identifies the neighboring cell responsible for the interference based on the direction found in block 308 and the cell topology. This neighboring cell is the neighboring cell closest to the mobile device for which the signal-to-noise ratio measurements were determined to be less than the interference threshold in block 304. In block 312, this identification process continues until the locator identifies the neighboring cell responsible for the interference. After the locator identifies the neighboring cell, in block 314 the communicator sends a request to reduce interference to the neighboring cell. The neighboring cell can then act to attempt to reduce the interference in a variety of different manners as discussed above.

Process 300 is discussed above using a direction-based technique in blocks 306-312. Alternatively, other techniques can be used to identify the neighboring cell, such as the cell that is closest to the mobile device for which the signal-to-noise ratio measurements were determined to be less than the interference threshold in block 304 as discussed above.

As can be seen from the discussions herein, the location-based detection of interference in cellular communications systems leverages signals and measurements already being used by the cellular base stations. For example, signal-to-noise ratio measurements that are already being measured by the cellular base stations for other uses can be leveraged for the location-based detection of interference in cellular communications systems. Accordingly, no additional signals need be sent by the mobile devices in order to detect the interference. Rather, the signals otherwise used by the cellular base stations and mobile devices to communicate data and/or control information between one another are leveraged by the location-based detection of interference in cellular communications systems. Additionally, no special actions need be taken by the mobile devices in order to detect the interference, such as no coordinated periods of silence need be performed by the mobile devices in order to detect the interference.

Additionally, as can be seen from the discussions herein the detection of interference in cellular communications systems is location-based. When a cellular base station detects that signals from a mobile device are being interfered with by a threshold amount, the cellular base station identifies the neighboring cell responsible for the interference based on the location of that mobile device. The cellular base station also requests that the cellular base station responsible for managing mobile devices in that neighboring cell attempt to reduce the interference. A broadcast statement to all neighboring cells need not be made; rather, the request can be sent just to the neighboring cell responsible for the interference. Accordingly, other neighboring cells need not attempt to reduce interference generated by mobile devices in those cells.

Figure 4:
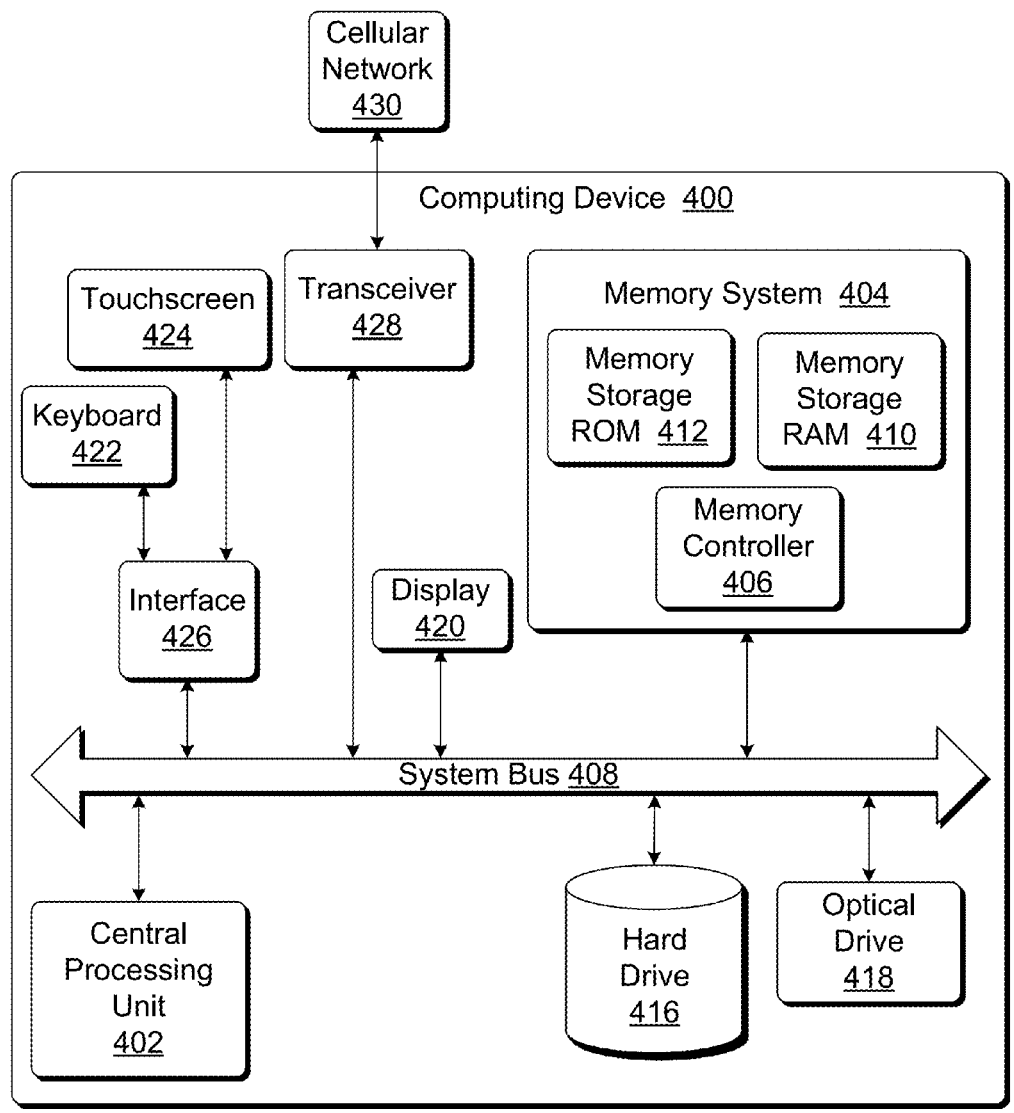
FIG. 4 is a generalized example of a computing device that can be used to implement the location-based detection of interference in cellular communications systems.

FIG. 4 is a generalized example of a computing device 400 that can be used to implement the location-based detection of interference in cellular communications systems in accordance with one or more embodiments. Computing device 400 can implement, for example, a cellular base station of FIG. 1 or portion thereof. For example, computing device 400 can implement communicator 172, interference analyzer 174, and locator 176 of FIG. 1. Computing device 400 can also implement, for example, a mobile device of FIG. 1.

One or more processing units, such as a central processing unit (CPU) 402, are included in computing device 400. A memory system 404 including a memory controller 406, random access memory (RAM) memory storage 410 and read only memory (ROM) memory storage 412 can store instructions and data for execution and use by CPU 402. Suitable bus architectures include a system bus 408, as well as a memory bus for communication between the CPU and memory system 404 via memory controller 406, and a peripheral bus for communication with peripheral devices. Additional hardware including mass data storage (e.g., a hard disk drive (HDD) 416) and an optical drive 418 (e.g., a digital video disk (DVD) drive) may be coupled to the CPU through respective drive interfaces. Input/output devices such as displays 420, keyboards 422, touchscreens 424, and so forth may be coupled via a video adapter in the former case and various serial or parallel interfaces 426 in the latter two cases. Example input/output interfaces include serial ports, parallel ports, universal serial buses (USB), video adapters, etc. Other hardware can be included in a similar fashion. One or more transceivers 428 can be included for communicating with other devices via one or more cellular network(s) 430.

Although the subject matter has been described in language specific to structural features and/or methodological operations, it is to be understood that the subject matter defined in the appended claims is not necessarily limited to the specific features or acts described above, including orders in which they are performed.

What is claimed is:

1. A method comprising:
   receiving, at a first cellular base station of a cell, uplink signals from multiple respective mobile devices managed by the first cellular base station;
   determining signal-to-noise ratios for the uplink signals received from the multiple mobile devices; and
   in response to the signal-to-noise ratios being less than an interference threshold for at least a particular amount of time, the particular amount of time being dependent on a number of the multiple mobile devices having signals with signal to-noise ratio measurements that are less than the interference threshold,
   determining, based on a direction from the first cellular base station to the multiple mobile devices and a cell topology of a cellular communications system that includes the first cellular base station, a neighboring cell generating interference for the multiple mobile devices, and
   communicating, from the first cellular base station to a second cellular base station managing the neighboring cell, a request effective to cause the second cellular base station to reduce the interference for the multiple mobile devices.

2. The method as recited in claim 1, further comprising determining, based on the uplink signals received from the multiple mobile devices, the direction from the first cellular base station to the multiple mobile devices in the cell.

3. The method as recited in claim 1, wherein the multiple mobile devices from which the uplink signals are received are within a threshold distance of each other.

4. The method as recited in claim 1, wherein
   the request to the second cellular base station is the request to alter operation of one or more mobile devices managed by the second cellular base station.

5. The method as recited in claim 4, wherein in response to the request, operation of the one or more mobile devices in the neighboring cell close to the cell managed by the first cellular base station are altered.

6. The method as recited in claim 1, wherein the uplink signals are signals that are otherwise used by the multiple mobile devices for communication purposes.

7. The method as recited in claim 1, wherein the particular amount of time that the signal-to-noise ratios are less than the interference threshold is further dependent on a difference between the signal-to-noise ratios and the interference threshold that indicates an amount of the interference from the neighboring cell.

8. One or more computer-readable storage devices comprising processor-executable instructions that, responsive to execution by a processor, implement an interference analyzer to:
   receive, at a first cellular base station of a first cell, uplink signals from multiple mobile devices in the first cell;
   identify that communications of the multiple mobile devices are being interfered with by more than a threshold amount when signal-to-noise ratios of the uplink signals are lower than a signal-to-noise threshold for at least a particular amount of time, the particular amount of time being dependent on a number of the multiple mobile devices having signals with signal-to-noise ratio measurements that are less than the signal-to-noise threshold;

determine, based on a direction from the first cellular base station to the multiple mobile devices and responsive to the signal-to-noise ratios being less than the signal-to-noise threshold for at least the particular amount of time, a second cell closest to the multiple mobile devices; and request that a second cellular base station that manages the second cell cause mobile devices of the second cell to reduce their transmission power effective to reduce interference for the multiple mobile devices.

9. The one or more computer-readable storage devices as recited in claim 8, wherein the request requests that transmission power of some of the mobile devices of the second cell to be reduced.

10. The one or more computer-readable storage devices as recited in claim 8 comprising additional processor-executable instructions that, when executed by the processor, implement the interference analyzer to generate the signal-to-noise ratios based on the uplink signals received from the multiple mobile devices.

11. The one or more computer-readable storage devices as recited in claim 8 comprising additional processor-executable instructions that, when executed by the processor, implement the interference analyzer to:

identify that uplink signals of another mobile device in the first cell are being interfered with by greater than the threshold amount; and reduce the particular amount of time that is exceeded to identify that communications of the multiple mobile devices are being interfered with.

12. The one or more computer-readable storage devices as recited in claim 8, wherein the uplink signals are signals that are otherwise used by the multiple mobile devices for communication purposes.

13. The one or more computer-readable storage devices as recited in claim 8, wherein the multiple mobile devices are within a threshold distance of each other within the first cell.

14. The one or more computer-readable storage devices as recited in claim 8, wherein the particular amount of time used to identify that the multiple mobile devices are being interfered with is also dependent on a difference between the signal-to-noise ratios and the signal-to-noise threshold that indicates an amount of the interference for the multiple mobile devices.

15. A computing device of a cellular base station, the computing device comprising:

one or more processors; and one or more computer-readable storage devices storing processor-executable instructions that, responsive to execution by the one or more processors, implement an interference analyzer to perform operations comprising:

receiving, via a receiver of the cellular base station, uplink signals from multiple mobile devices in a cell managed by the cellular base station;

identifying that communications of the multiple mobile devices are being interfered with by more than a threshold amount when signal-to-noise ratios of the uplink signals are lower than a signal-to-noise threshold for at least a particular amount of time, the particular amount of time being dependent on a number of the multiple mobile devices having signals with signal-to-noise ratio measurements that are less than the signal-to-noise threshold;

determining, based on a direction from the cellular base station to the multiple mobile devices, another cell closest to the multiple mobile device; and transmitting, from the cellular base station to the another cellular base station managing the another cell, a request effective to cause the another cellular base station to reduce interference for the multiple mobile devices in the cell managed by the cellular base station.

16. The computing device as recited in claim 15, wherein the request to the another cellular base station is a request to alter operation of one or more mobile devices managed by the another cellular base station.

17. The computing device as recited in claim 15, wherein the operations further comprise determining, based on the uplink signals received from the multiple mobile devices, the direction from the cellular base station to the multiple mobile devices in the cell.

18. The computing device as recited in claim 15, wherein the multiple mobile devices in the cell are within a threshold distance of each other.

19. The computing device as recited in claim 15, wherein the uplink signals received from the multiple mobile devices are signals that are received from only mobile devices within the cell.

20. The computing device as recited in claim 15, wherein the particular amount of time used to identify that the multiple mobile devices are being interfered with is further dependent on a difference between the signal-to-noise ratios and the signal-to-noise threshold that indicates an amount of the interference for the multiple mobile devices in the cell managed by the cellular base station.

* * * * *